United States Patent
Purushothaman

(10) Patent No.: US 10,552,242 B2
(45) Date of Patent: Feb. 4, 2020

(54) RUNTIME FAILURE DETECTION AND CORRECTION

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 222 days.

(21) Appl. No.: 15/706,888

(22) Filed: Sep. 18, 2017

(65) Prior Publication Data

US 2019/0087251 A1 Mar. 21, 2019

(51) Int. Cl.
*G06F 11/00* (2006.01)
*G06F 11/07* (2006.01)
*G06N 20/00* (2019.01)

(52) U.S. Cl.
CPC ...... *G06F 11/0709* (2013.01); *G06F 11/0775* (2013.01); *G06F 11/0787* (2013.01); *G06F 11/0793* (2013.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 4,665,523 A * | 5/1987 | Citron | G06F 7/724 714/785 |
| 5,539,877 A * | 7/1996 | Winokur | G06F 11/2257 714/26 |
| 6,343,236 B1 * | 1/2002 | Gibson | B61C 17/04 700/110 |
| 6,742,141 B1 * | 5/2004 | Miller | G06F 11/0748 706/45 |
| 6,760,903 B1 | 7/2004 | Morshed et al. | |
| 7,003,560 B1 * | 2/2006 | Mullen | G06Q 10/06 709/223 |
| 7,058,860 B2 * | 6/2006 | Miller | G06F 11/0727 714/47.3 |
| 7,062,755 B2 | 6/2006 | Partamian et al. | |
| 7,080,287 B2 * | 7/2006 | Salem | G06F 11/079 706/45 |
| 7,146,542 B2 * | 12/2006 | Srinivasan | G06F 11/0748 714/44 |
| 7,216,308 B2 * | 5/2007 | Teig | G06F 17/5077 716/129 |

(Continued)

*Primary Examiner* — Amine Riad
(74) *Attorney, Agent, or Firm* — Weiss & Arons LLP; Michael A. Springs, Esq.

(57) ABSTRACT

Systems and methods for managing and repairing errors occurring on a plurality of servers in an automated server build process is provided. Systems may include a first error code from a plurality of error codes. The first error code may be associated with a failure. The system may further include a plurality of sets of action codes. When the failure occurs on a server, included in the plurality of servers, during the server build process, the system may be configured to receive an error code from the server that may correspond to the failure and check the error code against previously recorded error codes recorded on an error code table. When the error code is included in the error code table, the system may retrieve the corresponding action code, assign the action code to the failure and execute the action code on the server.

19 Claims, 2 Drawing Sheets

(56) References Cited

U.S. PATENT DOCUMENTS

| | | | | |
|---|---|---|---|---|
| 7,257,735 B2* | 8/2007 | Arend | G06N 5/022 | 714/26 |
| 7,343,529 B1* | 3/2008 | Klinkner | G06F 11/0748 | 707/999.202 |
| 7,412,626 B2* | 8/2008 | Wood | H04L 41/064 | 714/38.1 |
| 7,509,538 B2* | 3/2009 | Triou, Jr. | G06F 11/3688 | 714/48 |
| 7,565,577 B2* | 7/2009 | Adams | G06Q 10/107 | 714/27 |
| 7,640,458 B2* | 12/2009 | Rao | G06F 11/1433 | 714/38.14 |
| 7,702,959 B2* | 4/2010 | Hwang | H04L 41/069 | 714/37 |
| 7,861,125 B2* | 12/2010 | Yamazaki | G06F 11/30 | 714/33 |
| 7,904,403 B2* | 3/2011 | Birsan | G06F 16/951 | 706/45 |
| 7,984,334 B2* | 7/2011 | Champlin | G06F 11/366 | 714/38.11 |
| 8,312,324 B2* | 11/2012 | Foley | G03G 15/5079 | 706/20 |
| 8,473,894 B2* | 6/2013 | Fox | G06F 9/44 | 717/101 |
| 8,526,940 B1* | 9/2013 | Chowdhary | H04W 24/08 | 455/424 |
| 8,566,267 B1* | 10/2013 | Ledbetter, Jr. | G06Q 10/04 | 706/46 |
| 8,578,335 B2* | 11/2013 | Bates | G06F 11/362 | 717/101 |
| 8,595,553 B2* | 11/2013 | Goertler | G16H 40/40 | 714/26 |
| 8,621,279 B1* | 12/2013 | Antukh | G06F 11/3664 | 714/26 |
| 8,645,760 B2* | 2/2014 | van Gilluwe | G06F 9/453 | 714/38.1 |
| 9,329,982 B2 | 5/2016 | Arif et al. | | |
| 9,367,427 B2 | 6/2016 | Andre et al. | | |
| 9,436,589 B2 | 9/2016 | Li et al. | | |
| 9,529,662 B1* | 12/2016 | Wangkhem | G06F 11/079 | |
| 9,575,874 B2 | 2/2017 | Gautallin et al. | | |
| 9,658,936 B2 | 5/2017 | Krajec et al. | | |
| 9,665,474 B2 | 5/2017 | Li et al. | | |
| 9,672,252 B2* | 6/2017 | Landry | G06F 11/0706 | |
| 10,229,028 B2* | 3/2019 | Addleman | G06F 11/3409 | |
| 10,296,717 B2* | 5/2019 | Isaacs | G06F 19/3456 | |
| 2003/0005362 A1* | 1/2003 | Miller | G06F 11/0727 | 714/27 |
| 2006/0036562 A1* | 2/2006 | Wu | G06N 5/022 | 706/50 |
| 2008/0155360 A1* | 6/2008 | Bates | G06F 11/362 | 714/57 |
| 2019/0155673 A1* | 5/2019 | Brooks | G06F 11/0784 | |

* cited by examiner

RUNTIME FAILURE DETECTION AND CORRECTION

FIELD OF TECHNOLOGY

Aspects of the invention relate to an automated server build process. Specifically, the invention relates to managing and repairing errors occurring during the server build process.

BACKGROUND OF THE DISCLOSURE

Building a single server can take one or several hours to build based on the needs of an individual user or a small corporation. The building of the server can be done manually. Since building servers for an individual or small corporation can be done without much assistance, if a part of the building process fails, the failure can also be corrected as part of the manual build.

Large corporations have the need to build, en masse, a vast plurality of servers. The vast plurality of servers that are needed to be built, may be located in several different regions. Due to the large number of servers being built, failures that occur also need to be responded to en masse.

It would be desirable, therefore, to have systems and methods for methodically managing and repairing the failures occurring on a vast plurality of servers during the server build process.

SUMMARY OF THE DISCLOSURE

Methods for managing and repairing errors occurring on a plurality of servers in an automated server build process is provided.

The method may include performing a server build process on one or more of a plurality of servers. The server build process may incur one or more errors.

When an error occurs at one or more of the plurality of servers during the server build process the method may include transmitting an error-alert. The transmission may be from one of the plurality of servers to a processor. The error-alert may identify the error-type for the error. The error-alert may identify the server causing the error.

The method may further comprise the processor receiving the error-alert.

The method may further comprise the processor verifying in a database, whether the error-type previously occurred.

When the error-type has been found recorded in the database, the method may further comprise retrieving a selected first set of action codes, from a plurality of sets of action codes. The selected first set of action codes may be the set of action codes that successfully repaired the error-type for the error defined in the error-alert. The selected first set of action codes may be recorded together with the error-type in the database.

When the selected first set of action codes that successfully repaired the error in the past has been retrieved, the method may further comprise the selected first set of action codes being executed on the server.

The method may further comprise the selected first set of action codes repairing the error on the server.

When the error is successfully repaired, the method may further comprise resuming the server build process on one or more of the plurality of servers.

In the event where the error-type has not been found recorded in the database, the method may further comprise attempting to execute a selected second set of action codes from the plurality of sets of action codes, on the server, to repair the error. The selected second set of action codes may be a set of action codes that have not yet been tested on an error.

When the execution of the selected second set of action codes successfully repairs the error, the method may further comprise resuming the server build process on one or more of the plurality of servers.

The method may further comprise recording the error and the selected second set of action codes successfully repairing the error as a corresponding pair.

In the event that the execution of the selected second set of action codes attempting to repair the error is unsuccessful, the method may further comprise attempting executing a selected third set of action codes from the plurality of sets of action codes, on the server, to repair the error.

When the attempt to repair the error using the selected third set of action codes is successful, the method may further comprise recording the error and the third set of action codes that was successful in repairing the error, as a corresponding pair.

The method may further comprise resuming the server build process on one or more of the plurality of servers.

In certain embodiments, the third set of action codes may be unsuccessful in repairing the error. The method may further comprise generating a generated set of action codes. The generating may be based on a plurality of recorded behavior patterns of stored historical failures. The generating may be based on a plurality of recorded metadata associated with the stored historical failures. The generating may be based on a plurality of sets of action codes that successfully repaired historical failures.

The method may further comprise executing the generated set of action codes on the server and may successfully repair the error.

The method may further comprise recording the error-type of the error and the generated set of actions codes that successfully repaired the error, as a corresponding pair.

The method may further comprise resuming the server build process.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
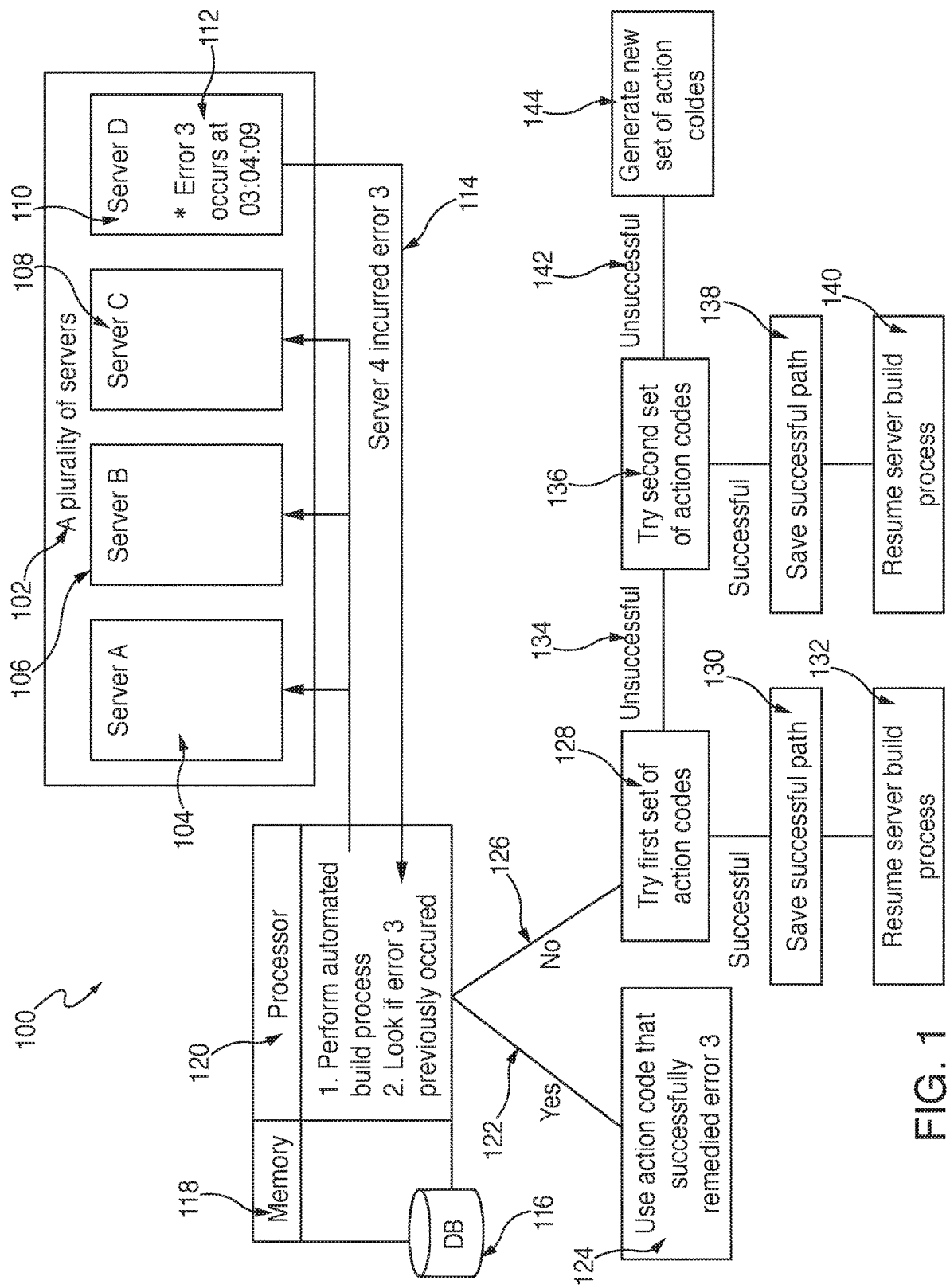
FIG. 1 shows an illustrative diagram according to certain embodiments.

A system for methodically managing and repairing errors occurring on a plurality of servers in an automated server build process is provided.

The system may include a first error code from a plurality of error codes. The first error code may be associated with a failure. The failure may be included in a plurality of failures. The failure may have occurred on one of the plurality of servers during a server build process.

The system may further include a plurality of sets of action codes. The plurality of sets of actions codes may be used for handling and repairing the plurality of failures.

When the failure occurs on a server, included in the plurality of servers during the server build process, the system may be configured to receive an error code from the server. The error code may correspond to the failure.

The failure may be a first-time occurrence occurring during a server build process. The failure may have occurred in previous server build processes.

The system may be configured to check the error code against previously recorded error codes recorded on an error code table. The error code table may include a list of error codes and its corresponding action codes. The error codes listed may identify the failure associated with the error codes. The associated action codes may be the action codes that have successfully repaired the failure.

When the error code is included in the error code table, the system may be configured to retrieve the corresponding action code.

The system may be further configured to assign the action code to the failure and execute the action code on the server.

When the error code is absent from the list of error codes, the system may be configured to assign a first set of action codes to handle and repair the failure.

The system may execute the first set of action codes on the server. The execution of the first set of action codes may be successful and the failure may be repaired.

In the event of success, the system may further be configured to record the first set of action codes and the corresponding error code that repaired the failure, on the error code table as a first matched pair.

In the event that the repair of the failure is unsuccessful, the system may be further configured to assign a second set of action codes included in the plurality of action codes, to attempt to repair the failure.

The system may execute the second set of action codes on the server. The execution of the second set of action codes may be successful and the failure may be repaired.

In the event of success, the system may further be configured to record the second set of action codes and the corresponding error code that repaired the failure on the error code table, as a second matched pair.

In the event that the second set of action codes does not repair the failure, the system may be further configured to generate a third set of action codes. The generated set of action codes may be based on a combination of a plurality of recorded behavior patterns of stored historical failures, a plurality of recorded metadata associated with the stored historical failures, and a plurality of sets of action codes that successfully repaired historical failures. The third set of action codes may be machine learned codes.

The recorded behavior patterns may include the occurrence pattern of each of the plurality of failures. The occurrence pattern may be the particular duration of time that the failure occurred during the server build process for each of the plurality of sets of failures.

The system may be further configured to assign the generated set of action codes to the failure. The system may execute the generated set of action codes on the server and successfully repair the failure.

The system may be further configured to record the generated set of action codes and the corresponding error code associated with the failure on the error code table as a third matched pair and resume the server build process.

In certain embodiments, the generated set of action codes may be unsuccessful in repairing the failure and the server build process may terminate and be flagged as failed.

In other embodiments, when the generated set of action codes is unsuccessful in repairing the failure, the system may be configured to repeat the generating on one or more different combinations of previous failure-types and associated action codes stored on the error code tables.

The repeating of the generating of different combinations may be continued until the execution of the generated sets of action codes successfully repairs the failure.

The system may be further configured to record the successful generated set of action codes and the corresponding error code on the error code table as the third matched pair and resume the server build process.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram 100 according to certain embodiments. A plurality of servers 102 may include Server A 104, Server B 106, Server C 108, and Server D 110. The plurality of servers 102 may be in connection with Processor 120 throughout the server build process.

During the server build process, one or more of a plurality of errors may occur. In the event that an error occurs, one of the pluralities of servers may display the error-type 112 for the error that occurs.

For example, an error may occur on Server D 110. Server D 110 may display the error-type 112 for the error that occurred. When the error occurs, error-alert 114 may be transmitted to the Processor 120. The Processor 120 may be configured to perform a check in database 116 determining, based on historical error information stored in the database, whether error-type 112 previously occurred. Database 116 may be saved on the memory 118.

In the event that Processor 120 determines error-type 112 to have previously occurred, as shown at 122, Processor 120 may be configured to use the action code that successfully remedied one or more of the pluralities of errors with the same error-type 112, as shown at 124.

In the event that Processor 120 does not find error-type 112 to have previously occurred, as shown at 126, Processor 120 may be configured to execute a first set of action codes to repair the error, as shown at 128. When the execution is successful, the error-type and the first set of action codes may be recorded as a corresponding pair, in the database 116, as shown at 130.

The server build process may then be enabled to resume the building of the plurality of servers, as shown at 132.

In the event that the first set of action codes does not successfully repair the error, as shown at 134, Processor 120 may be configured to execute a second set of action codes to repair the error, as shown at 136. When the execution is successful, the error-type and the second set of action codes may be recorded as a corresponding pair, in the database 116, as shown at 138.

The server build process may then be enabled to resume the building of the plurality of servers, as shown at 140.

In the event that the second set of action codes does not successfully repair the error, as shown at 142, Processor 120 may be configured to generate a new set of action codes, as shown at 144. The new set of action codes 144 may be generated based on the behavior and patterns associated with historically stored error information for the action codes in database 116.

Figure 2:
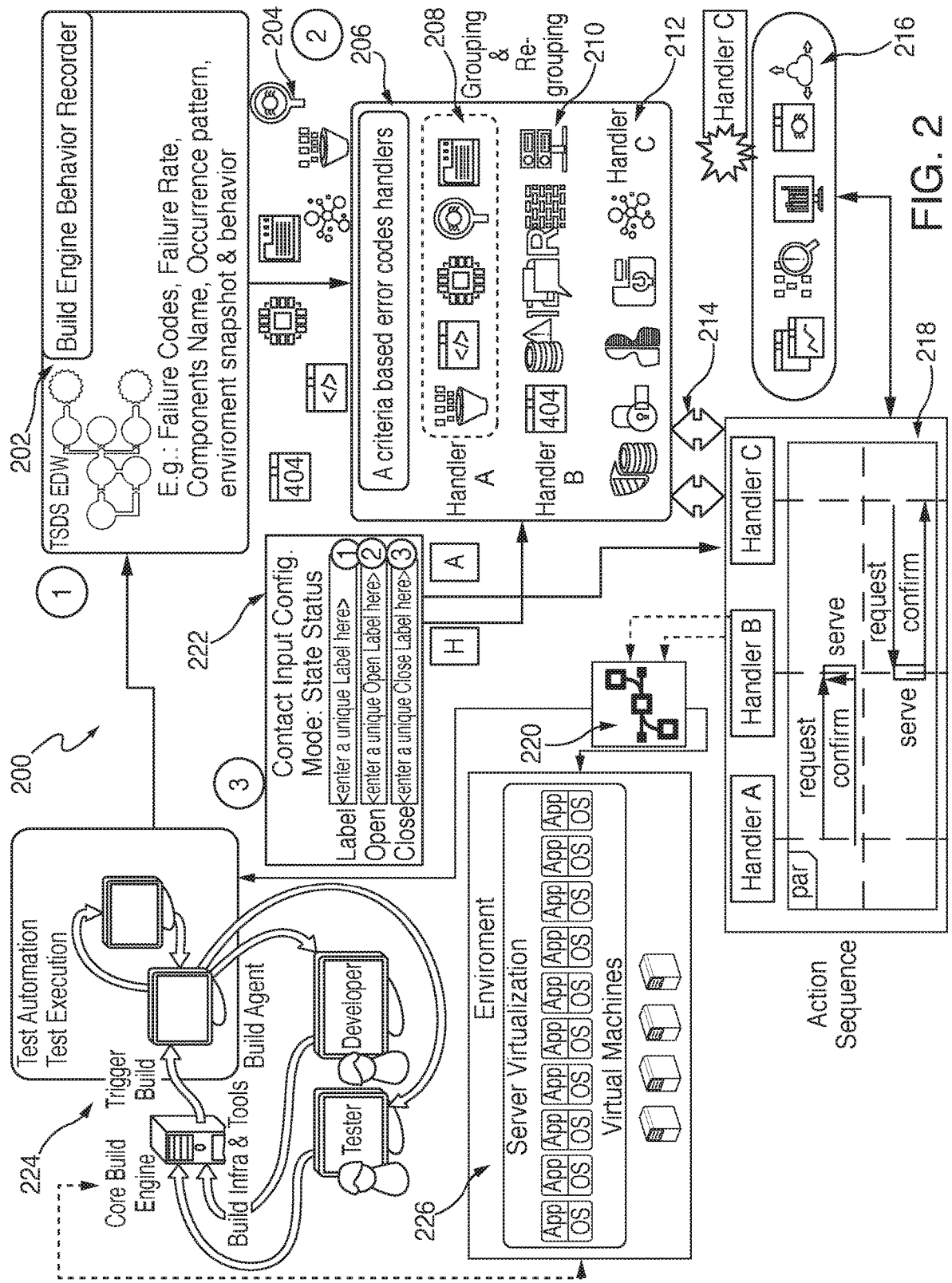
FIG. 2 shows another illustrative diagram according to certain embodiments.

FIG. 2 shows another illustrative diagram of a Server Build Process 200 according to certain embodiments. Build Engine Behavior Recorder 202 may be a machine learning module. Build Engine Behavior Recorder 202 may be enabled to learn different behaviors of the computer. Build Engine Behavior Recorder 202 may enable new action codes to be generated based on previous recorded behaviors.

Behaviors in Build Engine Behavior Recorder 202 may include the Failure Rate. Failure Rate may include how often the failure is occurring. Another behavior recorder associated with the Build Engine Behavior Recorder 202 may be the Failure Codes. Failure Codes may define the codes associated with the failures.

The Components Name may also be recorded. The Components Name may name the components of the failures. The Occurrence Pattern within the Build Engine Behavior Recorder 202 may mark the pattern of the occurrence of the failures.

Failures that occur during the server build process may be handled and repaired by sets of action codes (referred to herein and in the drawing, in the alternative, as "Handlers"). Handlers 206 may comprise sets of computer scripts where upon execution may repair the failures.

Handlers 206 may be configured to execute one, two, or more functions. Handlers 206 may be configured to execute a plurality of functions. Exemplary functions that handlers 206 may be configured to execute may include one or more of rebooting the Server Build Process 200, retrieving and downloading necessary software, resetting a particular piece of computer script and any other suitable functions.

Handler A 208 and Handler B 210 may be able to repair one or more of the failures 204. In certain embodiments, one handler will repair one of the failures. In other embodiments, one or more handlers may be necessary in repairing the failure.

In another embodiment, where Handler A 208 and Handler B 210 are unable to repair the failure, Handler C 212 may be generated by the system to handle and repair the failure. Handler C 212 may be generated based on behavior patterns recorded in Build Engine Behavior Recorder 202.

In the event that a failure occurs, Build Engine 224 may be configured to assign the appropriate Handler(s) for repairing the error as shown at Contact Input Configuration 222. Contact Input Configuration 222 may be enabled to upload the appropriate computer scripts to the Handlers at 206 independent of human intervention.

The association of the failures with the Handlers, and the sequence of actions taken in attempting to repair the failures, are seen at 218.

In one example, a request for repairing a failure from the plurality of failures 204, may be triggered. Handler A at 218 may confirm the capability of repairing the failure. Build Engine 224 may execute Handler A on one of the plurality of servers 226 to repair the failure. In the event that Handler A at 218 may be unable to repair the failure, the request may then be passed to Handler B at 218. Handler B at 218 may confirm the capability of repairing the failure and execute Handler B at 218 on one of the plurality of servers 226 to repair the failure. In the event that Handler B at 218 may be unable to repair the failure, the request may then be passed to Handler C at 218 which may be a handler generated based on Build Engine Behavior Recorder 202.

Network Indicator 220 may indicate a network. Network Indicator 220 may be in electronic communication with one, two, three or more of the components illustrated in FIG. 2. In some embodiments, Network Indicator 220 may be in electronic communication with all components illustrated in FIG. 2.

In another example, Handlers A, B, and C at 218 may all be essential in handling and repairing the failure.

Build Engine 224 may be a visual depiction of the overall process of the Server Build Process. Build Engine 224 depicts the setup of the build engine. Build Engine 224 encompasses multiple components of the server build mechanism. This may include server instance creation component, build agent, communicating mechanisms, tools and testing automation models.

The environment 226 may be a visual depiction of the virtual servers.

Thus, methods and apparatus for managing and repairing errors occurring during the server build process, have been provided. Persons skilled in the art will appreciate that the present invention can be practiced by other than the described embodiments, which are presented for purposes of illustration rather than of limitation. The present invention is limited only by the claims that follow.

What is claimed is:

1. A system for methodically managing and repairing errors in an automated server build process, said errors occurring on a plurality of servers, said system comprising:
   a first error code of a plurality of error codes, said first error code associated with a failure included in a plurality of failures that occurred on one of the plurality of servers during a server build process;
   a plurality of sets of action codes for handling and repairing the plurality of failures;
   wherein, when the failure occurs on a server, included in the plurality of servers, during the server build process, the system is configured to:
      receive an error code from the server, said error code that corresponds to the failure;
      check the error code against previously recorded error codes recorded on an error code table, said error code table which includes a list of error codes and corresponding action codes;
      determine that the error code is absent from the list of error codes;
      assign a first set of action codes to handle and repair the failure;
      execute the first set of action codes on the server;
      determine that the first set of action codes does not repair the failure;
      assign a second set of action codes included in the plurality of action codes, to attempt to repair the failure;
      execute the second set of action codes on the server;
      determine that the second set of action codes does not repair the failure;

generate a generated set of action codes, said generated set of action codes being based on a combination of:
a plurality of recorded behavior patterns of stored historical failures;
a plurality of recorded metadata associated with the stored historical failures; and
a plurality of sets of action codes that successfully repaired historical failures;
assign the generated set of action codes to the failure;
execute the generated set of action codes on the server;
determine that the generated set of action codes does not repair the failure;
terminate the server build process; and
flag the server build process as failed.

2. The system of claim 1 wherein the generated set of action codes are machine learned codes.

3. The system of claim 1 wherein the plurality of recorded behavior patterns further comprises the occurrence pattern of each of the plurality of failures, said occurrence pattern being the particular time the failure occurred during the server build process.

4. The system of claim 3 wherein the plurality of recorded behavior patterns further comprises the rate of the failure.

5. The system of claim 3 wherein the plurality of recorded behavior patterns further comprises a snapshot of the settings of the environment at the time of the failure.

6. The system of claim 3 wherein the plurality of recorded metadata further comprises the location of the failure, said location being a specific server from the plurality of servers where the failure occurred.

7. The system of claim 3 wherein the plurality of recorded metadata further comprises a code name for each of the failures.

8. A method for managing and repairing errors occurring on a plurality of servers in an automated server build process, said method comprising:
performing a server build process on one or more of the plurality of servers;
detecting an error at one of the plurality of servers during the server build process;
transmitting an error-alert during the server build process, from one of the plurality of servers to a processor, said error-alert identifying an error-type of the error;
receiving at the processor the error-alert;
determining, based on historical error information stored in a database, whether the error-type previously occurred;
when the error-type has occurred, retrieving a selected first set of action codes, from the plurality of sets of action codes, said selected first set of action codes being the set of action codes found in the database that successfully repaired the error-type for the error defined in the error-alert;
executing the selected first set of action codes on the server, thereby repairing the error;
resuming the server build process on the one or more of the plurality of servers;
wherein, when the error-type has not been found recorded in the database, said method comprising:
selecting a selected second set of action codes from the plurality of sets of action codes, on the server, to repair the error;
executing the selected second set of action codes from the plurality of sets of action codes, on the server to repair the error;
in the event that the execution of the selected second set of action codes successfully repairs the error:
resuming the server build process on one or more of the plurality of servers; and
recording the error-type associated with the error and the second set of action codes as a corresponding pair in the database;
in the event that the execution of the selected second set of action codes attempting to repair the error is unsuccessful, said method comprising:
selecting a selected third set of action codes from the plurality of sets of action codes, on the server, to repair the error; and
executing the selected third set of action codes from the plurality of sets of action codes, on the server, to repair the error;
in the event that the execution of the third set of action codes successfully repairs the error:
resuming the server build on one or more of the plurality of servers; and
recording the error and the selected third set of action codes successfully repairing the error as a corresponding pair in the database;
in the event that the execution of the selected third set of action codes attempting to repair the error is unsuccessful, said method comprising, generating a generated set of action codes, said generating being based on a combination of:
a plurality of recorded behavior patterns of stored historical failures;
a plurality of recorded metadata associated with the stored historical failures; and
a plurality of sets of action codes that successfully repaired historical failures;
executing the generated set of action codes on the server;
in the event that the execution of the generated set of action codes successfully repairs the error:
resuming the server build on one or more of the plurality of servers; and
recording the error and the generated set of actions codes successfully repairing the error, as a corresponding pair;
in the event that the execution of the generated set of action codes attempting to repair the error is unsuccessful, said method comprising:
repeating the generating on one or more different combinations of previous failure-types and associated action codes stored on the error code table, said repeating continuing until the execution of the generated sets of action codes successfully repairs the failure;
recording the successfully generated set of action codes and the corresponding error code on the error code table as the third matched pair; and
resume the server build process.

9. The method of claim 8 further comprising, said generated set of action codes being machine learned codes.

10. The method of claim 8 further comprising, said plurality of recorded behavior patterns comprising the occurrence pattern of each of the plurality of failures, said occurrence pattern being the particular time the failure occurred during the server build process.

11. The method of claim 8 wherein the error-alert further comprises general details of the occurrence of the error, said general details enabling assisting in the generating of the generated set of action codes.

12. The method of claim 11 wherein the general details further comprises a time at which the error occurred.

13. The method of claim 11 wherein the general details of the error-alert further comprises a particular point during the server build process at which the error occurred.

14. The method of claim 11 wherein the general details of the error-alert further comprises a server name, said server name being the name of the server at which the error occurred.

15. A system for methodically managing and repairing errors in an automated server build process, said errors occurring on a plurality of servers, said system comprising:
- a first error code from a plurality of error codes, said first error code associated with a failure included in a plurality of failures that occurred on one of the plurality of servers during a server build process;
- a plurality of sets of action codes for handling and repairing the plurality of failures;
- wherein, in the event that the failure occurs on a server, included in the plurality of servers, during the server build process, the system is configured to:
  - receive an error code from the server, said error code that corresponds to the failure; and
  - check the error code against previously recorded error codes recorded on an error code table, said error code table which includes a list of error codes and corresponding action codes;
- in the event that the error code is included in the error code table, the system is configured to:
  - retrieve the corresponding action code;
  - assign the action code to the failure; and
  - execute the action code on the server:
- in the event that the error code is absent from the list of error codes, the system is configured to:
  - assign a first set of action codes to handle and repair the failure; and
  - execute the first set of action codes on the server;
  - in the event that the first set of action codes successfully repairs the failure, the system is configured to record the first set of action codes and the corresponding error code, on the error code table, as a first matched pair;
- in the event that the first set of action codes does not repair the error code, the system is configured to:
  - assign a second set of action codes included in the plurality of action codes, to attempt to repair the failure; and
  - execute the second set of action codes on the server;
- in the event that the second set of action codes successfully repairs the failure, the system is configured to record the second set of action codes and the corresponding error code, on the error code table, as a second matched pair;
- in the event that the second set of action codes does not repair the failure, the system is configured to, generate a generated set of action codes, said generated set of action codes based on a combination of:
  - a plurality of recorded behavior patterns of stored historical failures;
  - a plurality of recorded metadata associated with the stored historical failures; and
  - a plurality of sets of action codes that successfully repaired historical failures;
- assign the generated set of action codes to the failure;
- execute the generated set of action codes on the server;
- in the event that the generated set of action codes successfully repairs the failure, the system is configured to record the generated set of action codes and the corresponding error code on the error code table as a third matched pair and resume the server build process;
- in the event that the generated set of action codes does not repair the failure, the system is configured to:
  - repeat the generating on one or more different combinations of previous failure-types and associated action codes stored on the error code table, said repeating continuing until the execution of the generated sets of action codes successfully repairs the failure;
  - record the successful generated set of action codes and the corresponding error code on the error code table as the third matched pair; and
  - resume the server build process.

16. The system of claim 15 wherein the third set of action codes are machine learned codes.

17. The system of claim 15 wherein the plurality of recorded behavior patterns further comprises the occurrence pattern of each of the plurality of failures, said occurrence pattern being the particular duration of time the failure occurred during the server build process.

18. The system of claim 15 wherein the plurality of recorded metadata further comprises the location of the failure, said location being a specific server from the plurality of servers where the failure occurred.

19. The system of claim 15 wherein the plurality of recorded metadata further comprises a name of the failure.

* * * * *